Aug. 23, 1932.    I. SERRURIER    1,873,341
FILM VIEWING MACHINE
Filed May 10, 1927    4 Sheets-Sheet 1

Inventor
Iwan Serrurier
By Lyon+Lyon
Attorneys

Aug. 23, 1932.  I. SERRURIER  1,873,341
FILM VIEWING MACHINE
Filed May 10, 1927  4 Sheets-Sheet 2
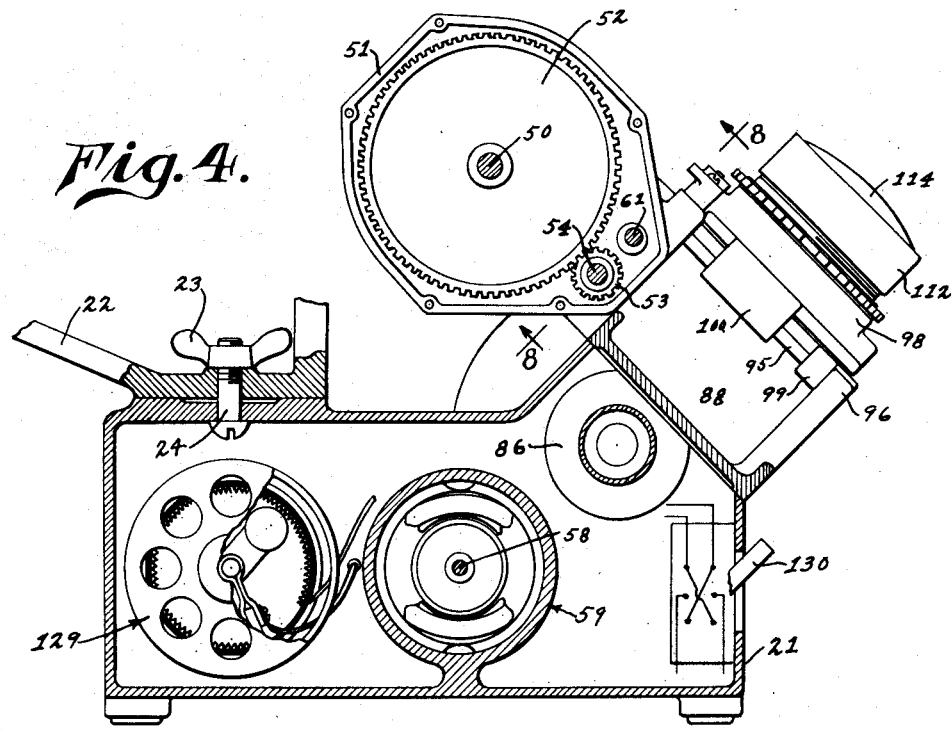
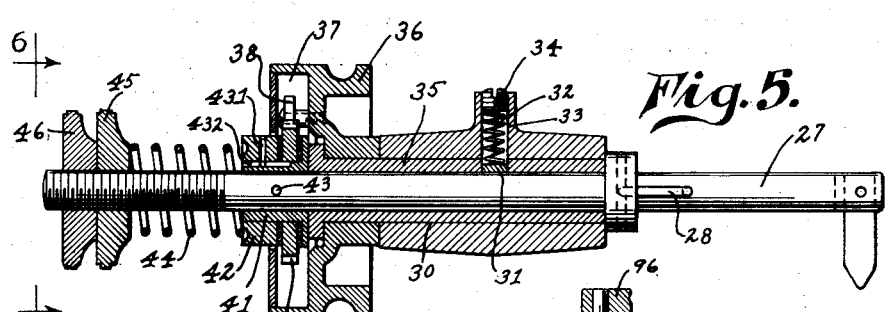
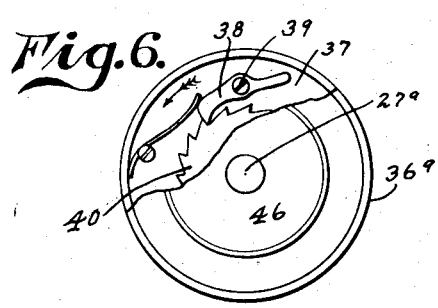
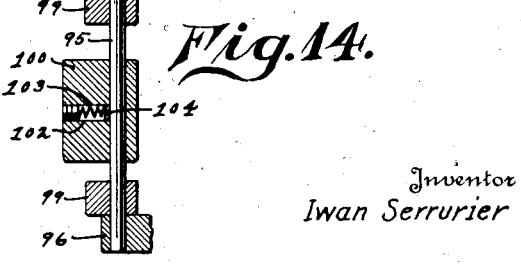
Inventor
Iwan Serrurier
By
Attorneys Aug. 23, 1932.  I. SERRURIER  1,873,341
FILM VIEWING MACHINE
Filed May 10, 1927   4 Sheets-Sheet 3
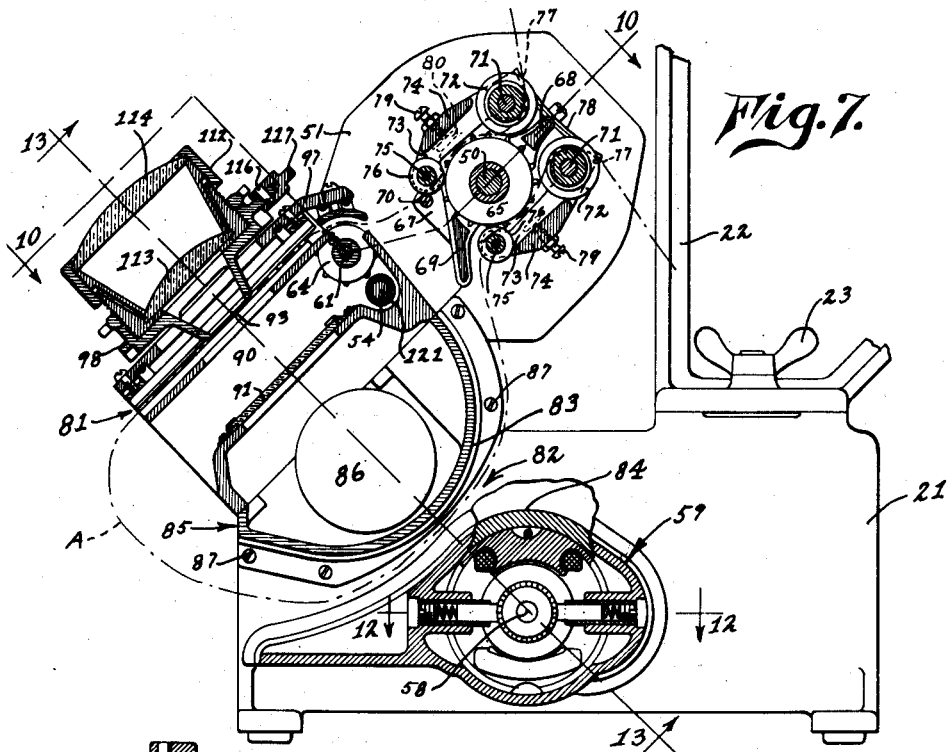
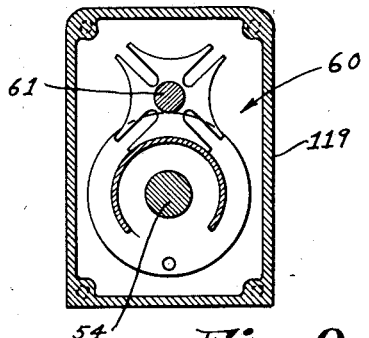
Inventor
Iwan Serrurier Aug. 23, 1932.                I. SERRURIER                1,873,341
                            FILM VIEWING MACHINE
                      Filed May 10, 1927       4 Sheets-Sheet 4
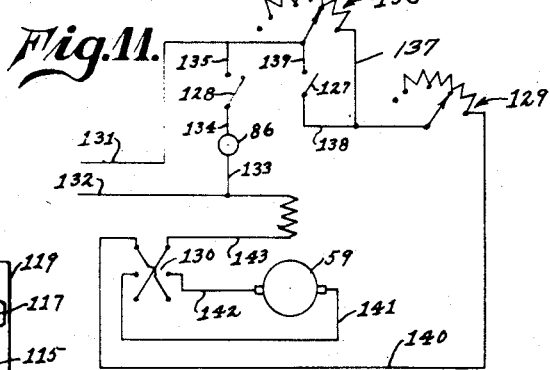
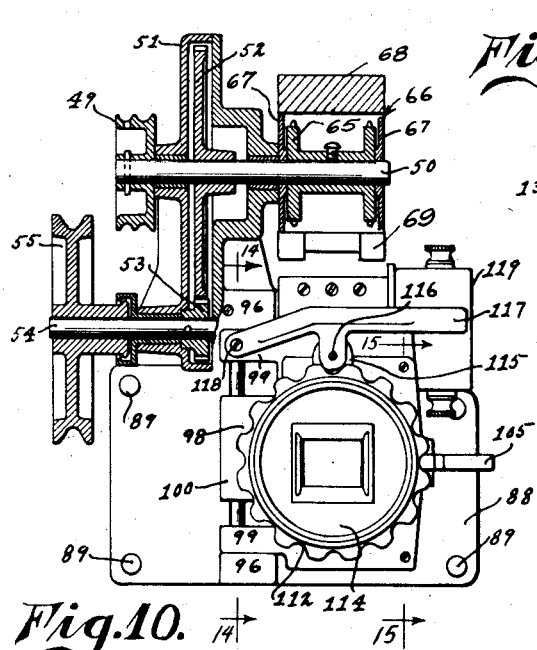
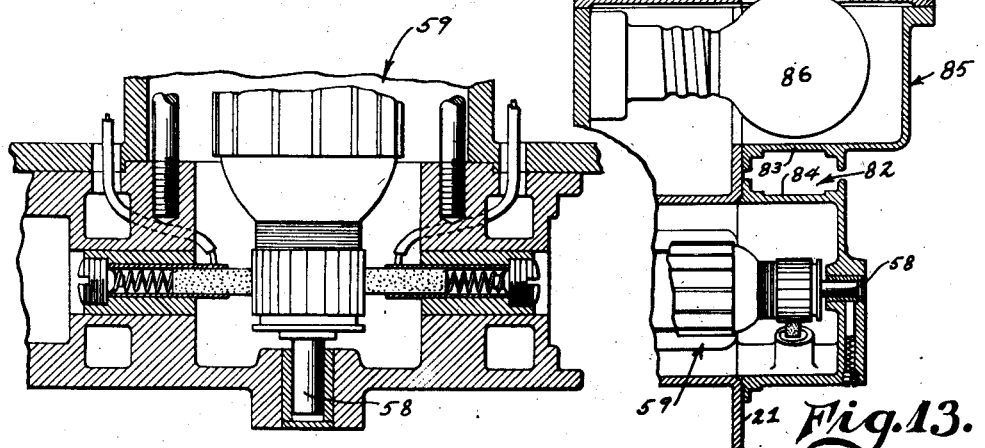
Inventor
Iwan Serrurier Patented Aug. 23, 1932

1,873,341

UNITED STATES PATENT OFFICE

IWAN SERRURIER, OF LOS ANGELES, CALIFORNIA

FILM-VIEWING MACHINE

Application filed May 10, 1927. Serial No. 190,178.

This invention relates to film-viewing machines, which machines are utilized for viewing motion picture films so as to determine what portions are to be cut from said films, and at what frame the cut is to be made; and, also where the films are to be cut for insertion of the sub-titles and other descriptive matter.

An object of the invention is to provide a compact machine of this type that can be power driven and readily controlled as to speed and stopping and starting.

Another object is to provide a novel construction of framing device whereby the film can be properly framed in the viewing thereof, regardless of the exact position that the film is applied to the feed sprocket.

Another object is to make provision for reversing the run of the film at any desired instant so that that portion of the film that has been viewed, may again run before the eye of the operator.

Other objects and advantages will appear in the subjoined detailed description.

The accompanying drawings illustrate the invention.

Figure 4 is an enlarged fragmental section on the line indicated by 4—4, Figure 1.

Figure 5 is an enlarged fragmental section on the line indicated by 5—5, Figure 2.

Figure 6 is an elevation from the line indicated by 6—6, Figure 5, portions being broken away to expose a portion of the ratchet mechanism.

Figure 7 is an enlarged fragmental elevation, mainly in section on the line indicated by 7—7, Figure 1.

Figure 8 is a fragmental sectional detail on the line indicated by 8—8, Figure 4.

Figure 9 is an enlarged sectional view on the line indicated by 9—9, Figure 8.

Figure 10 is an elevation, partly in section from the irregular line indicated by 10—10, Figure 7.

Figure 11 is a diagram of the electrical connections.

Figure 12 is an enlarged fragmental section on the line indicated by 12—12, Figure 7.

Figure 13 is a fragmental sectional view on the line indicated by 13—13, Figure 7.

Figure 14 is a fragmental sectional detail on the line indicated by 14—14, Figure 10.

Figure 15 is a fragmental sectional detail on the line indicated at 15—15, Figure 10.

Figures 1, 2, 3:
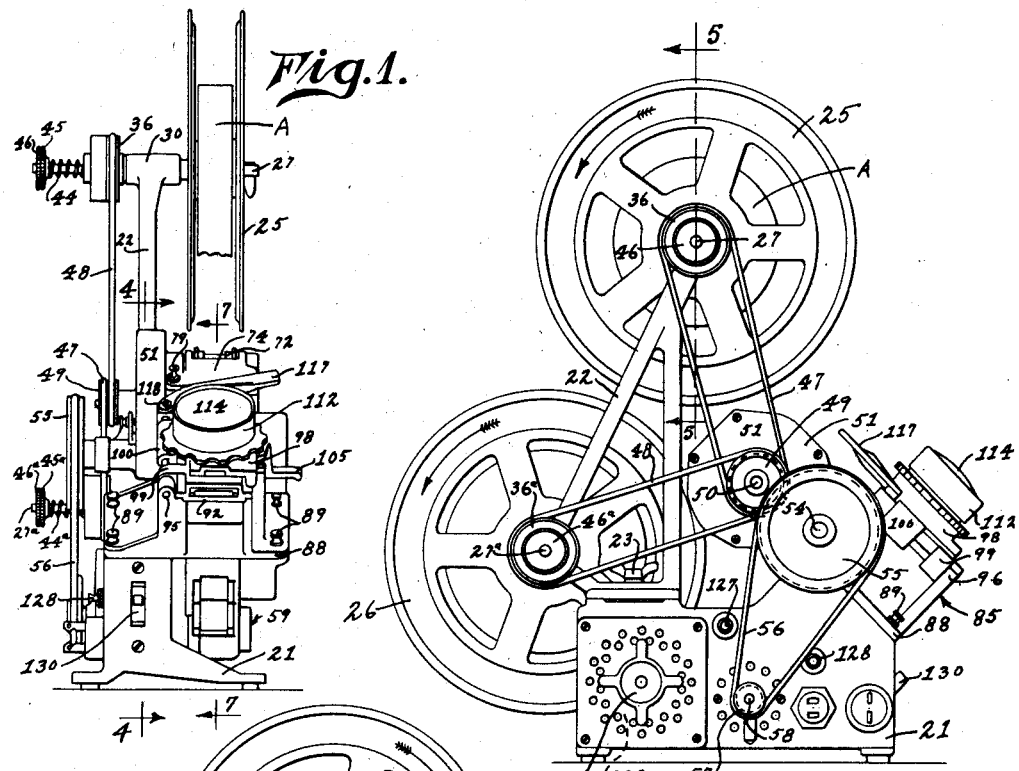
Figure 1 is a front elevation of a film-viewing machine constructed in accordance with the provisions of this invention.
Figure 2 is an elevation of Figure 1 from the left thereof.
Figure 3 is an elevation of Figure 1 from the right thereof.

There is provided a hollow base 21 and removably mounted thereon is a standard 22 which is secured in place by a wing nut 23 on a screw 24 that projects from the upper face of the base. Rotatably connected with the standard 22 and supported thereby, are upper and lower spools 25, 26 on which the film indicated at A is wound. The spools 25, 26 are of identically the same construction as is also the means whereby they are rotatably connected with the standard 22. Accordingly, only one of the connection means will be described as follows: The hub of the spool is mounted on a shaft 27, a key 28 in the shaft engaging in a key way 29 in the spool hub to prevent relative rotation of the shaft and the spool. The shaft 27 is mounted to rotate in a bearing 30 on the standard 22 and the shaft is held against too free turning by a friction means embodying a friction member 31 receiving pressure from a coil spring 32 in a spring chamber 33, the outer end of the spring resting against a plug 34 screwed into the outer end of the chamber 33. The spring chamber opens to the bore of the bearing 30, thus permitting the friction member 31 to rub upon the periphery of the shaft 27. In this instance, the bearing 30 includes a bushing 35 and on said bushing is rotatably mounted a pulley 36 which is thus loose on the shaft 27. The pulley 36 is provided with a chamber 37 and in said chamber is a pawl 38 which is pivotally connected at 39 to the pulley 36. The pawl 38 is adapted to engage the teeth of a ratchet wheel 40 which has its opposite faces in frictional engagement with members 41, 42. The member 41 is tubular and is fixed to the shaft 27 by a pin 43. The member 42 is tubular and is slidably mounted on the member 41 and is preferably held from turning relative to the member 41 by a pin 431 mounted in the member 42 and projecting into a slot 432 in the member 41. The pawl and the teeth of the ratchet wheel are arranged so that turning of the pulley 36 in the direction of the arrow in Figure 6 will drive the ratchet wheel and so that when the pulley is turned in the opposite direction, the pawl will slip over the ratchet teeth. The ratchet wheel 40 is held in frictional engagement between the members 41, 42 by a coil spring 44 that surrounds the shaft and the degree of friction may be varied by more or less compressing the spring 44. Compression of the spring 44 is effected by a nut 45 screw threaded onto the shaft 27. Engaging the nut 45 is a lock nut 46. The pawl and ratchet teeth associated with the shaft of the upper spool 25 are constructed and arranged to effect driving of the spool 25 in the direction of the arrow thereon in Figure 2, and the pawl and ratchet teeth associated with the shaft of the lower spool 26 are constructed and arranged to effect driving of the spool 26 in the opposite direction. This enables either spool to be driven so that the film can be wound upon either spool, thus enabling the film to be moved either forward or backward. The shaft for the spool 26 is designated at 27a and the pulley associated with said shaft is designated at 36a. Aside from the direction in which the ratchet teeth point, the constructions for rotating the two spools are identical.

The pulleys 36, 36a are driven by belts 47, 48, respectively. Belts 47, 48 are driven by a pulley 49 on a shaft 50 which is rotatably mounted in a gear case 51. In the gear case 51 is a spur gear 52 which is fast on the shaft 50 and which is driven by a spur pinion 53 mounted on a shaft 54 which is rotatably mounted in the gear case 51. Fast on the shaft 54 is a pulley 55 driven by a belt 56 from another pulley 57 on the shaft 58 of an electric motor 59. The shaft 54 drives a Geneva movement which is indicated in general by the character 60. The Geneva movement 60 intermittently drives a shaft 61 mounted in bearings 62, 63. On the shaft 61 is a film driving sprocket 64.

That portion of the film A that extends between the spools 25, 26 and the film driving sprocket 64 is engaged by the opposite sides of a sprocket wheel 65 fixed to the shaft 50.

Supported on the shaft 50 is a film guide 66 provided with end members 67 through which the shaft 50 projects, said members 67 being at opposite ends of the sprocket wheel 65. The film guide 66 comprises cross guide arms 68, 69 which are supported at their ends by the members 67. One of the members 67 is secured by a screw 70 to the gear case 51.

Projecting from one side of the gear case 51 are studs 71 on which are rotatably mounted flanged film guide rollers 72. The rollers 72 are on opposite sides of the guide arm 68. Pivotally carried by the studs 71 are brackets, each comprising a pair of arms 73 connected by cross bars 74. The arms 73 of each bracket engage the stud 71 at opposite ends of the associated roller 72. To the free ends of the arms 73 of each bracket is secured a stationary shaft 75 and on each shaft 75 is rotatably mounted a grooved film guide roller 76. The ends of the arms 73 closest to the studs 71 are aslant outwardly and rearwardly as indicated at 77 and a spring 78 engages the ends 77 tending to swing the arms 73 inwardly toward the sprocket wheel 65. In threading the film through the machine, the arms 73 will be swung outwardly so as to permit the film to be placed around the sprocket wheel 65. To properly space the rollers 76 from the sprocket wheel 65, each of the bracket cross bars 74 is provided with a screw 79 which is screwed through said cross bar 74 and has its inner ends engaging a shoulder 80 on the adjacent face of the gear case 51.

When the film A is to be operated in a forward direction, the sprocket wheel 64 intermittently pulls the film A through a gate 81 from a film guide slot 82 to which it is fed by the sprocket wheel 65. Said guide slot 82 is formed by a space between an upper semi-circular wall 83 and a lower curved wall 84. The wall 83 constitutes the bottom wall of a lamp housing which is indicated in general by the character 85. Said housing contains a lamp 86. The curved wall 84 constitutes a portion of the housing for the motor, said motor being housed in the base 21 and the curved wall 84 being a detachable portion of said base. The lamp housing 85 is secured to the base 21 by screws 87 or other suitable fastening devices.

The lamp housing 85 is formed in separable sections, the upper section 88 constituting a cover which is detachably held in place by fastening devices 89. The gear case 51 is mounted on the cover 88. The cover section 88 has a passage 90 therethrough for the passage of light rays from the lamp 86, and, in this instance, is provided with a light diffusing window 91, which may be made of opal glass, and through which the light rays pass.

The gate 81 comprises a stationary lower member 92 secured to the cover section 88 and having an orifice 93 alined with the passage 90. The film gate also comprises an upper hinged unit 94 which is hingedly connected to the lower section 92, the hinge pin being indicated at 95. The hinge pin 95 is supported at its opposite ends in lugs 96 of the housing section 88.

The hinged unit 94 comprises a lower secintermittently move the film through the guiding means, and the enlarging viewing lens, thus making the lamp readily accessible and at the same time, providing for compactness of the parts of the machine.

The invention operates as follows: The film A having been threaded into position, as indicated in Figure 3 of the drawings, the observer closes the switch 128 to effect illumination of the film and, if necessary, he operates the reversing switch into position to drive the motor 59 in a direction to propel the film forward, in which case the upper spool will be turned in the direction of the arrow thereon in Figures 2 and 3. The rheostat 136 will be in the off position and the switch 127 open. Then the observer will operate the rheostat 129 to the full or short circuiting position. To advance the film, the observer will operate the rheostat 136 to close the circuit. He may operate the film faster or slower by proper operation of the rheostat 136. If he desires to stop the film at any particular point, he releases pressure on the rheostat 136, thus opening the motor circuit. If he desires to run the film backward, he will change the reversing switch and then operate the rheostat as before, in which event the lower spool will be driven in a direction opposite to that indicated by the arrow thereon in Figures 2 and 3, and he will stop the film at the desired point by again releasing pressure on the rheostat.

Instead of using the foot operated rheostat 136, the operator may, of choice, first close the switch 127 and then operate the rheostat 129 which is hand operated, the operating knob of the rheostat 129 being indicated at 144.

I claim:

1. A film-viewing machine comprising a base, a standard mounted on said base, spools rotatably mounted on the standard, means to drive the spools in opposite directions only and but one spool at a time, a lamp housing mounted on the base and provided with a detachable cover, a gate through which the film passes from spool to spool, the gate mounted on the cover, a lens mounted on the gate, a lamp in the housing beneath the gate, and means to intermittently move the film through the gate.

2. The film-holding gate described comprising a stationarily mounted lower member provided with an orifice, a hinge pin connected with said member, a gate section mounted to swing on said hinge pin and nonslidable along said pin, and an apertured gate section mounted to slide on said pin.

3. The film-holding gate described comprising a stationarily mounted lower member provided with an orifice, a hinge pin connected with said member, a gate section mounted to swing on said hinge pin and nonslidable along said pin, and an apertured gate section mounted to slide on said pin, a second pin carried by one of the sections, the other section having a sliding engagement with the second pin.

4. A film-viewing machine comprising a base, a standard mounted on said base, spools rotatably mounted on the standard, means to drive the spools in opposite directions only and but one spool at a time, a gate through which the film passes from spool to spool, a lens mounted on the gate, a lamp beneath the gate, spaced upper and lower walls connected with one side of the base to define a groove through which the film passes between the gate and one of the spools, and means to intermittently move the film through the gate.

5. A film-viewing machine comprising a base, a lamp housing secured to the base, a lamp in said housing, a film-holding gate mounted on said housing, a mechanism for operating the film, a motor in the base operably connected with said mechanism, and a housing for said motor, the bottom wall of the lamp housing being spaced from a portion of the motor housing to define a film guide slot between them.

6. A film-viewing machine comprising a body provided with an opening, a cover detachably mounted on and supported by said body and closing said opening, a lamp socket in the body, a motor in the body, control devices in the body for the lamp and motor, electric wiring in the body connecting the control devices with the motor and lamp, a gate in the cover provided with a film-viewing aperture and including a hinged member, means on the cover for guiding the film over the aperture, means on the cover for intermittently moving the film through the guiding means, an enlarging film-viewing lens on the hinged member over the aperture, and driving connections between the motor and the film-viewing means.

7. The film-holding gate described comprising, a stationarily mounted lower member provided with an orifice, a hinge pin connected with said member, a gate section mounted to swing on said hinge pin and nonslidable along said pin, an apertured gate section mounted to slide on said pin, and a friction producing means on the apertured gate section engaging the pin.

8. The film-holding gate described comprising, a stationarily mounted lower member provided with an orifice, a hinge pin connected with said member, a gate section mounted to swing on said hinge pin and nonslidable along said pin, an apertured gate section mounted to slide on said pin, and a lever fulcrumed on the first-mentioned gate section and pivotally connected with the apertured gate section.

9. A film-viewing machine comprising a base portion, a lamp housing secured to and positioned immediately adjacent said base tion 97 and an upper section 98 shiftably mounted on the section 97. The hinging of the unit is accomplished by providing hinge lugs 99 on the lower section 94 and a hinge lug 100 on the upper section 98, the hinge pin 95 passing through the lugs 99, 100. The width of the lug 100 is less than the space between the lugs 99 so as to admit of sliding movement of the section 98. The section 98 is provided with an aperture 101 which may be brought into proper registration with the frames of the film by shifting of the upper section 98. To yieldingly hold the section 98 against shifting, the hinge lug 100 is provided with a spring chamber 102 containing a coil spring 103 which presses a friction piece 104 against the hinge pin 95, thus frictionally holding the section 98 against sliding along the hinge pin. The unit 94 of the gate may be swung open on the hinge pin 95 so that the film can be inserted between the unit 94 and the lower gate member 92, and to normally hold the gate unit 94 in closed position, I provide a pivoted latch 105 having a shoulder 106 adapted to engage over the upper face of a lug 107 projecting laterally from the gate section 97. The pivot of the latch 105 is indicated at 108, and is secured to the housing section 88.

In order to hold the gate section 98 against swinging on the hinge pin 95 independently of the gate section 97, it is advisable to provide a guide means at that side of the gate that is opposite to the hinge pin 95. This guide means, in this instance, is constructed as follows: The upper gate section 98 is provided with spaced downwardly projecting lugs 109 which support the opposite ends of a pin 110 that slides in a cylindrical guide way 111 in the gate section 97.

The gate section 98 carries a lens mounting 112 which, in this instance, is provided with lenses 113, 114 through which the images on the film are viewed by the observer.

In order to conveniently slide the gate section 98, said gate section is provided with a lug 115 to which is pivoted at 116 an operating member or lever 117, said lever being fulcrumed at 118 on the hinge lug 99. The free end of the lever 117 projects sufficiently beyond the pivot 116 to afford a convenient handle whereby to operate said lever.

It is important, in a machine handling motion picture film, that lubricating oil be kept from contact with the film and it is also important that the Geneva movement that gives the intermittent motion to the film be well lubricated. In this instance, the Geneva movement 60 is enclosed in a grease-tight case 119 and the shafts 54, 61 project outside of said case. The shaft 61 projects through the bearing 63 supported in the case 119, and the shaft 54 projects through a bearing 120 also supported in the case 119. The bearings 62, 63 are eccentric and, therefore, adjustable by turning them so as to relatively adjust the moving parts of the Geneva movement. To prevent lubricant that may run along the shaft 54 from being thrown therefrom onto the film, there surrounds the shaft 54 a sleeve 121 which projects from the bearing 120 and extends into an opening 122 in the gear case 51, the shaft 54 extending through said opening and said opening communicating with the interior of the gear case 51. The other bearing for the shaft 54 is indicated at 123 and between the bearing 123 and the pulley 55 is a lubricant drain chamber 124 provided at its bottom with an orifice 125 so as to drain out lubricant that may enter said chamber. Preferably the shaft 54 is provided with an oil throwing shoulder 126 which rotates inside of the chamber 124. Thus any lubricant that finds its way along the shaft 54 through the bearing 123 is disposed of so as not to run onto other parts of the operating mechanism.

On the base 21 are mounted switches 127, 128 and within the base is mounted a rheostat 129. Also mounted on the base 21 is a reversing switch 130. The switches and rheostat are of well known construction and, therefore, need not be described in detail herein and the electrical connections are illustrated in Figure 11 of the drawings where one of the electric current supply wires is indicated at 131 and the other at 132. A wire 133 connects one terminal of the lamp 86 to the wire 132 and another wire 134 connects the other terminal of said lamp to one terminal of the switch 128 and the other terminal of said switch is connected by a wire 135 to the wire 131. The wire 131 connects to a rheostat 136 which is not illustrated in the drawings excepting diagrammatically in Figure 11. The rheostat 136 is preferably of the foot pedal operated type so that it can be operated by the foot of the observer. The rheostat 136 is connected by a wire 137 to the rheostat 129 and a wire 138 connects the wire 137 to one terminal of the switch 127, the other terminal of said switch being connected by a wire 139 to the rheostat 136. The reversing switch 130 connects by a wire 140 to the rheostat 129 and connects by other wires 141, 142 and 143 to the motor 59. The wire 132 also connects to the motor 59. The base 21 and lower lamp housing section together constitute the body of the machine, and the cover 88 is detachably mounted on said body. It will be readily understood from the foregoing that the body holds the lamp, motor, electric wiring and electric control devices for the lamp and motor, and the connections for connecting an outside source of electricity and outside control devices to the machine; and that the cover carries the gate containing the film viewing aperture, the means for guiding the film over said aperture, the means to portion, a lamp in said housing, a film-holding gate mounted on said housing on a side thereof away from said base portion, a mechanism for feeding film through said gate from one side of said housing and thence around said housing and back to said mechanism, the juxtaposed parts of said adjacent base portion and lamp housing having channels and shoulders thereon defining a film guide slot between them for the passage of the film about said lamp housing.

Signed at Los Angeles, this 3d day of May, 1927.

IWAN SERRURIER.